: 2,951,068
Patented Aug. 30, 1960

2,951,068

POLYMERIZATION PROCESS

Ervin G. Pritchett, Silverton, and Harry Greenberg, Cincinnati, Ohio, assignors to National Distillers and Chemical Corporation, New York, N.Y., a corporation of Virginia No Drawing. Filed May 12, 1958, Ser. No. 734,421

4 Claims. (Cl. 260—94.9)

This invention relates generally to an olefin polymerization process and to a combination catalyst useful therefor. More particularly, the invention relates to polymerization of an olefin such as ethylene at relatively low pressures in the presence of such a catalyst.

This invention is based on the discovery that relatively high density, high molecular weight, high melting, linear polyolefins of substantially low ash content and outstanding physical properties can be prepared by the herein described process utilizing a combination catalyst of which one component is a dispersion of sodium prepared in presence of a defined amount of water.

Broadly speaking, the polymerization process of this invention is carried out in the presence of a suitable reaction medium with a catalyst which is a combination of finely divided sodium, prepared in the presence of a defined amount of water, and a tetrahalide of a group IV$b$ metal, i.e., titanium, zirconium, hafnium and thorium. In such a catalyst combination, the sodium is employed in a proportional amount of more than about one gram atom per mole of the group IV$b$ metal tetrahalide. More specifically, the combination catalyst employed for practice of this invention comprises the aforesaid components in a ratio of about two to about four gram atoms of sodium per gram mole of the group IV$b$ metal tetrahalide. Although, generally speaking, substantially larger proportional amounts of sodium to the aforesaid tetrahalide may be used, such as eight or more gram atoms of sodium to one gram mole of the tetrahalide, the amount of sodium employed generally need not exceed about 8 gram atoms and, more preferably not more than about 4 gram atoms per mole of the tetrahalide. Moreover, and although in the use of more than 4 gram atoms of sodium, such as up to about 8 or more gram atoms, per mole of the tetrahalide generally results in production of ethylene polymers comparable to those obtained by use of more than one and up to about four gram atoms of sodium, the rate of the polymerization reaction tends to decrease when more than about 4 gram atoms of sodium per mole of the tetrahalide is employed. Thus, in preferred aspect, the invention is carried out with a catalyst in which the relative proportions of its essential components comprise from more than one to about four gram atoms of finely divided sodium per gram mole of the described metal tetrahalide.

With reference to the other component of the combination catalyst, i.e., a tetrahalide of a metal as aforedefined, the tetrachlorides of metals such as titanium and zirconium are preferred. However, and although for purposes of illustration, specific aspects of the invention are described hereinafter with use of titanium tetrachloride as the tetrahalide component of the catalyst, such usage is for purposes of illustration and not limitation as also contemplated for such a catalyst component are other halides of the group IV$b$ metals, such as the tetrabromides, illustrative of which are the tetrabromides of titanium, zirconium, etc.

It is important in practice of this invention that the sodium component of the combination catalyst be in finely divided form and, in most instances, that it be of rather well defined characteristics as to particle size. Particularly useful for practice of the invention, with respect to the sodium component, are dispersions of sodium particles which average less than about 5 microns in size. Still, more preferably, the sodium component consists essentially of particles of sodium not in excess of about 3 microns in size with a still more particularly preferred catalyst comprising, as the sodium component, of dispersions of sodium consisting of particles of 1 to 3 microns in size in mixture with sub-micron size sodium particles.

As to the total amount of catalyst utilized for the polymerization reaction, the amount employed may be varied over a rather wide range, as for example, about 0.25 to about 5% by weight based on the weight of the reaction medium (e.g., n-hexane). In preferred embodiment, however, the catalyst is used in amounts of from about 0.5 to about 1.5% by weight of the reaction medium.

For practice of this invention, the reaction may suitably be carried out by contacting ethylene under relatively mild conditions of pressure with the combination catalyst, the sodium component of which is a suspension of finely divided sodium in an inert liquid, e.g., a hydrocarbon, as for example, an aliphatic hydrocarbon such as heptane and mineral spirits, aromatic hydrocarbons such as decalin, tetralin, xylene, toluene, and the like, with additional examples of suitable dispersant liquids being those disclosed hereinafter as diluents or liquid reaction mediums.

The process embodied herein may be carried out at relatively low pressures and, as to reaction temperatures, room temperatures (e.g., about 20° C.) may suitably be employed as well as lower temperatures, such as about −20° C. to substantially higher temperatures, such as up to about 300° C. Preferred practice utilizes a reaction temperature as low as possible commensurate with obtainment of high yields of desired polymer product and, generally suitable therefor, are use of temperatures in the range of from about 0° to about 200° C. Although the process embodied herein is normally carried out under pressures above atmospheric, exceptionally high pressures are not required. Thus, in general, the process is carried out with use of pressures that may range from about 0 to about 5,000 pounds per square inch gauge or higher with a preferred range being from about 300 to about 500 pounds per square inch gauge.

The polymerization reaction is carried out either in batch, semi-continuous, or continuous operations. Most conveniently, and in the preferred embodiments, the process is carried out in a diluent or liquid reaction medium, the amount not being unduly critical, but it should be at least sufficient to permit effective agitation and, preferably, to hold the major portion of the polymer in suspension. Organic solvents and/or diluents of the organic hydrocarbon class such as petroleum ether, pentane, cyclopentane, the hexanes, cyclohexanes, heptane, mineral spirits, and mixtures of these materials can be used. It is preferred that the material used be free of impurities which may react to destroy catalyst activity or which copolymerize with ethylene; that is, materials such as alcohols and unsaturates should be preferably absent. Thus, the diluent should essentially consist of one or more inert saturated hydrocarbon, that is, hydrocarbons devoid of olefinic unsaturation.

For this improved process, pure ethylene may be used or there may be used, equally well, a gas mixture containing major quantities of ethylene, provided no impurities are present which will destroy the catalyst and/ or contaminate the polymer products. For instance, ethylene obtained by the cracking of hydrocarbon streams is satisfactory if acetylenic materials are not present.

In carrying out the herein described polymerization process, it is preferable and highly desirable to maintain the polymerization zone free of extraneous reactive gases. This can be done by keeping the reactor blanketed at all times with an inert gas, for instance, operating with an inert gas such as nitrogen, argon and helium. Preferably, the reactor and its contents are blanketed with ethylene gas to avoid unnecessary dilution of the reactor contents with inert gases.

In contacting the ethylene with the catalyst combination, one suitable method is to prepare a dispersion of sodium of the suitable particle size characteristics. This can be done by initially dispersing the sodium in the reaction medium and adding the metal tetrahalide thereto. Ethylene or ethylene-containing feed is passed into the resulting dispersion or it may be present in solution before final addition of the group IVb metal tetrahalide. Absorption of ethylene starts immediately upon addition of either ethylene to the catalyst combination or addition of the metal tetrahalide to the alkali metal dispersion containing dissolved ethylene in solution. Absorption is generally accompanied by a rise in temperature. When absorption has ceased or slows down considerably, ethylene flow is stopped. The crude polymer (insoluble in heptane) is isolated by filtration of the reaction mixture followed by washing to remove catalyst, and drying.

With further reference to preparation of the novel combination catalyst embodied herein, it may be prepared prior to subjecting it to contact with the olefin to be polymerized or, if desired, may be prepared in situ. For example, the catalyst may be prepared by addition of the group IVb metal halide to a suspension of sodium of suitable particle size characteristics to provide a preformed combination catalyst for subsequent contact with the olefin. On the other hand, the combination catalyst may be prepared in situ. That is, a dispersion of finely divided sodium can be contacted with ethylene, or there can be provided a dispersion of the sodium and in which dispersion ethylene has been dissolved, followed by addition of the group IVb metal halide in appropriate amount. Studies of various methods for preparation of the combination catalyst have revealed that, in order to prepare the combination catalyst in a most active state and with obtainment of optimum results, particularly with respect to consistency of performance in catalyzing the ethylene polymerization, the group IVb metal halide should preferably be added to the suspension of sodium particles, rather than in reverse order. Hence, and although the invention embodied herein contemplates use of a combination catalyst, containing the essential components aforedefined, that effectively catalyzes the described olefin polymerization reaction irrespective of the manner of the catalyst preparation, it is in most cases desirable and in many cases essential that it be prepared by addition of the group IVb metal halide to the sodium dispersion.

In accordance with this invention, it has been found that if the sodium dispersions are prepared in the presence of a defined amount of water, substantially reproducible results with high yields of polymers are obtained. Accordingly, the present invention resides in the use of a sodium dispersion in a suitable inert liquid prepared in the presence of a small amount of water as, for example, from about 0.1 to about 1.0% based on the weight of sodium and, more preferably, from about 0.2 to 0.4% based on the amount of sodium.

Such dispersions may suitably be prepared by use of a colloid mill blanketed with an inert gas which is fed from a hopper, blanketed with an inert gas such as argon, from which materials fed to the mill are drawn into the homogenizing chamber of the mill. The chamber is charged with the desired amount of the inert carrier liquid in which there is dissolved, preferably, an emulsification agent, with the contents of the hopper being at a temperature of about 100 to 160° C. The sodium, usually in small pieces, is added to the hopper with the mill in operation and the mill is operated for a period of time sufficient to reduce the sodium in size and provide the particle size characteristics for practice of this invention. The small amount of water, required for practice of this invention, is preferably added to the feed hopper prior to addition of the sodium. In preferred embodiment, this invention is carried out by adding the sodium in substantially anhydrous form in the carrier liquid and the required amount of water added separately but the invention may be carried out with sodium which is wet with the required amount of water (measured by gain in weight) such as may be provided by exposure of the sodium to the atmosphere prior to its use for preparation of the finely divided dispersions.

For purposes of further describing the invention, the following examples are set forth as illustrative and not limitative embodiments. In determining properties of the polymer products, such as molecular weight and density, the determinations were made in accordance with the following:

*Molecular weights.*—Molecular weights were determined from the intrinsic viscosity of the polyethylene products (tetralin) at 105° C. The equation relating intrinsic viscosity and molecular weight is:

$$(n) = 1.35 \times 10^{-4} M^{0.63}$$

This relationship was developed by Harris [I. Harris, J. Poly. Sci., 8, 353 (1952)] who measured viscosities at 75° in xylene. These polymers cannot be handled under these conditions because of their limited solubilities. In theory, however, the intrinsic viscosity is independent of solvent and temperature.

*Density.*—Densities of the polyethylene were obtained by immersing the heat-compressed material into a series of solutions possessing different specific gravities at 25° C. The density of the solution in which the polymer neither sank nor floated, but remained suspended in the liquid, was taken as the density of the polyethylene.

For the data presented in the following tabulation, the sodium component of the combination catalyst was finely divided sodium having an average particle size of 1 to 2 microns, a maximum particle size of about 3 microns (determined by visual examination with a calibrated eyepiece) and comprising a substantial amount of sub-micron particles. For run Nos. 1 and 2, the dispersion was prepared in absence of water whereas, for run Nos. 3–8, the sodium dispersion was prepared by adding, during preparation, 0.4% by weight of water (based on the weight of sodium). In each case, the combination catalyst was comprised of 0.0375 g. atom of sodium and 0.009 mole of titanium tetrachloride in 400 ml. of heptane and the polymerization was carried out at 300–500 p.s.i.g. of ethylene at 25–30° C.

More specifically, the polymerizations for which data are shown in the following tabulation were each carried out as follows: 300 ml. of heptane were placed in a clean, dry, stirred autoclave at about 25–30° C. under a protective atmosphere of argon. 0.0375 g. atom of sodium in the form of the aforesaid dispersion was then washed in with 50 ml. of heptane, and was followed by 0.009 mole of titanium tetrachloride washed in with 50 ml. of heptane. The autoclave was sealed, and ethylene was pressured in at intervals during the ensuing reaction so that the pressure was maintained at 300 to 500 p.s.i.g. Reaction was continued for a period of 60 minutes, and was then stopped by cessation of stirring. Excess ethylene gas was released, and the polyethylene product was removed from the autoclave. The product, a solid, was filtered from the heptane solvent and was then washed successively with methanol, methanolic hydrogen chloride, water, mentanol and acetone. The resulting wet solid was then dried in a vacuum oven below the softening temperature of the polymer.

Run No.: Polymer yield [1] (in grams)
1 — 35
2 — 6.5
3 — 53
4 — 59
5 — 57
6 — 58
7 — 49.6
8 — 55.6

[1] Molecular weight is greater than one million; density 0.96.

As is apparent from the foregoing data, in run Nos. 3–8, inclusive, in which the sodium dispersion was prepared in presence of 0.4% water (based on weight of sodium), not only were high yields of polymer obtained under the stated reaction conditions but were so obtained with substantial uniformity. On the other hand, as shown for run Nos. 1 and 2, in which similar reaction conditions were utilized but with the sodium dispersion prepared in absence of water, there resulted lower and inconsistent yields of polymer. Thus, such data clearly illustrate the unexpected improvement that results by practice of the invention residing in use, as a catalyst component, of a sodium dispersion prepared in presence of the aforedefined amount of water.

The polymeric products which are obtained are readily and conveniently handled, and can be processed and treated in accordance with regularly accepted practice to produce, for example, elastic and flexible sheets, films and the like. The products also can be extended by suitable extrusion means or molded by injection molding. They can also be used in fiber-forming operations to obtain ribbons, filaments, and threads having high flexural and tensile strength. The polymers can be spun into fibers and filaments using the methods and techniques generally applicable to nylon type materials.

The expression "high molecular weight polyethylene" as used herein in both the specification and claims refers to polymeric products produced from the olefin by the process embodied herein that may vary over a rather wide range of molecular weight. Thus such polymeric products may be of relatively high molecular weight, such as about a million to about five million or more, as well as relatively lower molecular weight polymeric products, as for example, from about 60,000 and higher.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for polymerizing ethylene to a normally solid polyethylene by subjecting ethylene at a temperature of from about −20° C. to about 300° C. and a pressure of from substantially atmospheric to about 5000 p.s.i.g. in the presence of a polymerization catalyst comprising a tetrahalide of titanium and a dispersion of sodium in an inert liquid in which the sodium particles average less than about five microns in size, the improvement which comprises utilizing as the sodium component of said catalyst sodium of said particle size characteristics dispersed in an inert liquid and prepared by subdividing sodium to said particle size characteristics in the presence of from about 0.1 to about 1.0% of water based on the weight of sodium.

2. A process, as defined in claim 1, wherein the sodium dispersion is prepared in presence of from about 0.2 to about 0.4% of water based on the weight of sodium.

3. A process, as defined in claim 1, wherein the tetrahalide of titanium is titanium tetrachloride.

4. A process, as defined in claim 1, wherein the sodium dispersion consists of sodium particles of one to three microns in size in mixture with sodium particles of submicron size.

References Cited in the file of this patent

UNITED STATES PATENTS

| | | |
|---|---|---|
| 2,751,288 | Corneil | June 19, 1956 |
| 2,767,229 | Gleason | Oct. 16, 1956 |
| 2,836,633 | Esmay et al. | May 27, 1958 |
| 2,867,612 | Pieper et al. | Jan. 6, 1959 |
| 2,879,263 | Anderson et al. | Mar. 24, 1959 |

FOREIGN PATENTS

| | | |
|---|---|---|
| 1,132,506 | France | Nov. 5, 1956 |